M. Tuells.
Measuring Board.

No. 102,885.    Patented May 10, 1870.

Witnesses;
John L. Lewis
Charles Hitchum

Inventor;
Motza Tuell

United States Patent Office.

MELZER TUELLS, OF PENN YAN, NEW YORK.

Letters Patent No. 102,885, dated May 10, 1870.

IMPROVEMENT IN IMPLEMENT FOR MEASURING BOARDS.

The Schedule referred to in these Letters Patent and making part of the same

I, MELZER TUELLS, of Penn Yan, in the county of Yates and State of New York, have invented certain Improvements in Computing Board Rules, of which the following is a specification.

My invention relates to a computing board rule that will measure boards or timber, and compute the number of feet measured, and indicate the same, so that the operator will not have to tally or make figures until the whole number of feet indicated by the rule are measured, or the quantity to be measured is finished when it is less than the rule will compute.

Figure 1:
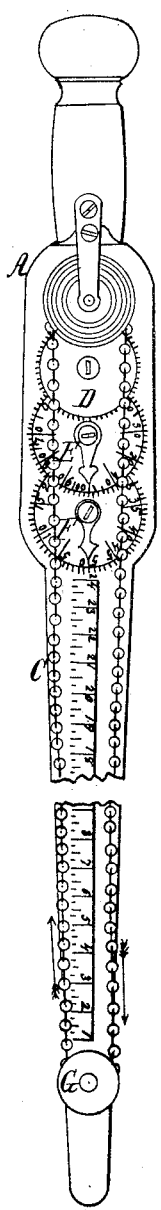
Figure 2:
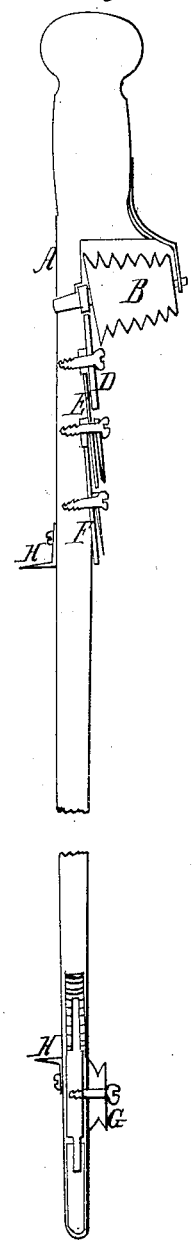

Figure 1 is an outline drawing, and
Figure 2 a longitudinal vertical section.

A is the stock; it may be made any required length or size, and provided with a handle similar to a walking-stick, so that it may be used as such. To it the other parts are fastened, as represented in the figures.

The part below the wheels has a rule made upon it, so that it may be used to measure the length of boards or timber. Any number or kind of rules may be made upon it. The part where the wheels are applied should be made wide enough to shield them properly.

B is a grooved roller. It is made in the shape of a frustum of a cone, and has as many grooves as there are various lengths to be measured. Its use is to give the required motion to the wheels, and the diameter of the grooves must correspond with the different lengths of boards, so that when the chain is put in a groove that is made for a given length of board, and is moved in the direction of the arrows in fig. 1, the same as the width of the board, the roller will move the wheel E so that it will indicate the number of superficial feet in the board.

The rule is better adapted to all length of boards and timber when the grooves correspond with the feet in length, from nine to sixteen, inclusive. The axis of the roller should be inclined, as shown in fig. 2. At the base of the cone is a pinion that gives motion to the wheels.

C is a chain that is used to manipulate the roller. A belt or cord may be used in its stead if preferred. It may be put in any one of the grooves; it must be put in the groove that is made for the length of the board or timber to be measured.

The operator then places the rule on the board, then moves the chain in the direction of the arrows, the same distance as the width of the board, which will cause the indicating-wheel to move to correspond with the number of superficial feet in the board.

If the board is twice the length then move the chain twice; if the board, plank, or timber is to be reduced to board measure, then move the chain across as many times as there is superfices to be counted. If a board is but half the length the rule is fixed to measure, then move the chain half the width of the board, and thus with any fractional length, and the wheels will compute the thousands and indicate the number of feet less than one hundred correctly, until the number of thousands are measured that the rule is made to measure and compute.

D is an intermediate wheel between the roller and the wheel E. Its position is shown in each figure. Its use is to transmit motion from the roller to the wheel E.

The number of teeth must be such as to give the proper motion to the wheel E. It has a pinion fastened to the under side, at the center, that communicates with the wheel E and moves it.

E is an indicating-wheel. It is made to rotate once for every hundred feet measured, and the upper surface is graduated and numbered, and it is provided with a stationary index, so that the operator may see how many feet have been measured at any time.

At the under side is a pin, or other device, that will move the wheel F one cog at each revolution, thus causing it to compute the number of hundreds measured.

When about to begin measuring this wheel must be turned until the unit is under the point of the index.

F is the computing-wheel. It must be made with the number of teeth that it is required to compute, (the number of hundreds,) and its outer surface is graduated in thousands, and fractional parts thereof, and numbered, and it is provided with an index, so that the operator may see how many hundreds or thousands have been measured, as represented in fig. 1.

It is actuated by a pin, or any other device, that may be fixed to the under side of the wheel E. It is also provided with a spring-catch, of any kind, that will allow it to be moved a cog at a time, and hold it safely, to prevent it being moved accidentally, and, at the same time, allow the operator to place the unit under the point of the index when he begins to measure.

G is a pulley that is used to keep the chain or band in position. It is fastened by a pivot to a sliding piece, as represented in fig. 2.

The sliding piece is provided with a spring that will force it in the direction to keep the chain always sufficiently tight, so that it will move the roller B correctly.

H and H are stops that are put on the under side or either edge of the stock, as preferred.

It is well to place them at the ends of the scale, to be convenient for other measurements. Their use is to assist the operator in adjusting the rule, and prevent the rule moving while the chain is being moved, thus enabling the operator to measure lumber as correctly in the dark as in the light.

I claim—

The combination of the graduated stock A, provided with stops H H, the pulley G, grooved conical roller B, gear-wheel D, registering-wheels E F, and chain C, or its equivalent, all arranged substantially as and for the purpose described.

MELZER TUELLS.

Witnesses:
JOHN L. LEWIS,
CHARLES KETCHUM.